(12) United States Patent
Mondal

(10) Patent No.: US 8,381,191 B2
(45) Date of Patent: Feb. 19, 2013

(54) INTENTION BASED APPLICATION CUSTOMIZATION

(75) Inventor: Joy Mondal, Asansol (IN)

(73) Assignee: Apple Inc., Cupertino, CA (US)

( * ) Notice: Subject to any disclaimer, the term of this patent is extended or adjusted under 35 U.S.C. 154(b) by 1251 days.

(21) Appl. No.: 12/141,609

(22) Filed: Jun. 18, 2008

(65) Prior Publication Data

US 2009/0319979 A1 Dec. 24, 2009

(51) Int. Cl.
*G06F 9/44* (2006.01)
*H04L 9/32* (2006.01)

(52) U.S. Cl. .......................... 717/127; 717/103; 713/177

(58) Field of Classification Search .......... 717/100–107, 717/127–149, 163–178; 713/168–186
See application file for complete search history.

(56) References Cited

U.S. PATENT DOCUMENTS

| | | | |
|---|---|---|---|
| 5,689,708 A * | 11/1997 | Regnier et al. | 709/229 |
| 5,797,015 A * | 8/1998 | Daniels et al. | 717/163 |
| 5,897,635 A * | 4/1999 | Torres et al. | 1/1 |
| 7,219,101 B2 | 5/2007 | Dorsey | |
| 7,263,663 B2 | 8/2007 | Ballard et al. | |
| 7,275,681 B2 | 10/2007 | Vandewalle et al. | |
| 7,293,237 B1 | 11/2007 | Knight et al. | |
| 7,313,448 B2 | 12/2007 | Dietrich et al. | |
| 7,870,535 B2 * | 1/2011 | Rippert et al. | 717/100 |
| 2003/0182551 A1 * | 9/2003 | Frantz et al. | 713/170 |

OTHER PUBLICATIONS

Jan De Clercq; Single Sign-On Architectures; Hewlett-Packard, 2002, pp. 1-30.*
Pfitzmann et al.; Analysis of Liberty Single-Sign-on with Enabled Clients; IEEE, pp. 38-44.*

* cited by examiner

*Primary Examiner* — Wei Zhen
*Assistant Examiner* — Satish Rampuria
(74) *Attorney, Agent, or Firm* — Novak Druce Connolly Bove + Quigg LLP

(57) ABSTRACT

Intention based application customization is provided. When an application is launched, the components of the application are identified. A resource assigns a customized script to at least one component and on first access to that component supplied initial data values. On subsequent access attempts the data values are resupplied to the customized script to perform automated replay actions on behalf of the resource.

30 Claims, 3 Drawing Sheets

INTENTION BASED APPLICATION CUSTOMIZATION

BACKGROUND

Increasingly, enterprises and users are using the Internet to conduct business and personal affairs. In response to this, enterprises are developing applications and services to cover virtually all aspects of these transactions. One area of particular concern is security.

More specifically, users, with their various transactions, process a lot of applications which need credentials for validation so that the users can gain access to different types of assets. In that context, Single Sign On (SSO) capabilities with those applications is a much needed feature for any industry to reduce the overhead of credential management at both the user level and also at the organization level.

There are some credential processing options available to reduce that overhead and to store a user's credentials and thereby give the user a facility to achieve seamless login to those applications of interest. But for this to be achieved successfully, the applications need to be altered/rewritten so that the application can internally call the externally exposed Application Programming Interfaces (APIs) of the credential mechanisms.

To highlight the issue, consider that nowadays Linux, as an operating system (OS), is used by a majority of the end users in a variety of industry domains. With Linux, GNOME is widely used as desktop environment which is built on top of GTK (GNOME Tool Kit) framework. So, making GNOME GUI applications SSO enabled requires rewriting of all those applications. This is quite difficult and virtually impossible to achieve in any practical or realistic time frame.

Still another problem exists that is associated with tracking a user's actions for a particular GTK application. Today, user's actions are tracked based on the coordinates of the display. That means, the movement of the user's cursor is tracked and coordinate values are stored for purposes of recording data associated with the user's action with the application. So, any realignment of the application on the display device will tear apart any replay mechanism based on the previously captured data. Essentially, the user's intention is based on the user's actions at runtime within the display. But, this may not always be what the user wants.

Therefore, improved techniques are needed for enhancing applications without modifying the application code associated with those applications.

SUMMARY

In various embodiments, intention based application customization is provided. More specifically, and in an embodiment, a method is provided for defining intention based application customization. An application is identified as lacking a definition when the application is being launched within memory of a device. A component interface is launched for a resource to view components of the application and provide the definition for the application. Next, a selection for a particular component is received from the resource. Finally, a reference is acquired from the resource; the reference is to a customized script for the particular component. Further, the customized script is to be processed when the particular component within the application is accessed by the resource and when the application processes. Moreover, when a first access is detected, the resource is prompted for data values that are to be retained and resupplied on subsequent accesses made to the particular component. Also, each time the customized script is processed on accesses to the particular component, the data values are supplied on behalf of the resource.

DETAILED DESCRIPTION

A "resource" may include a user, content, a processing device, a node, a service, an application, a system, a schema definition, a directory, an operating system (OS), a file system, a data store, a database, a policy definition, a configuration definition, a file, a World-Wide Web (WWW) service, a WWW page, groups of users, combinations of these things, etc. The terms "service," "application," and "system" may be used interchangeably herein and refer to a type of software resource that includes instructions, which when executed by a machine performs operations that change the state of the machine and that may produce output.

Various embodiments of this invention can be implemented in existing OS's, application architectures, and/or graphical user interface (GUI) systems. Any particular architectural layout or implementation presented herein is provided for purposes of illustration and comprehension only and is not intended to limit aspects or embodiments of the invention.

It is within this context, that various embodiments of the invention are now presented with reference to the FIGS. 1-4.

Figure 1:
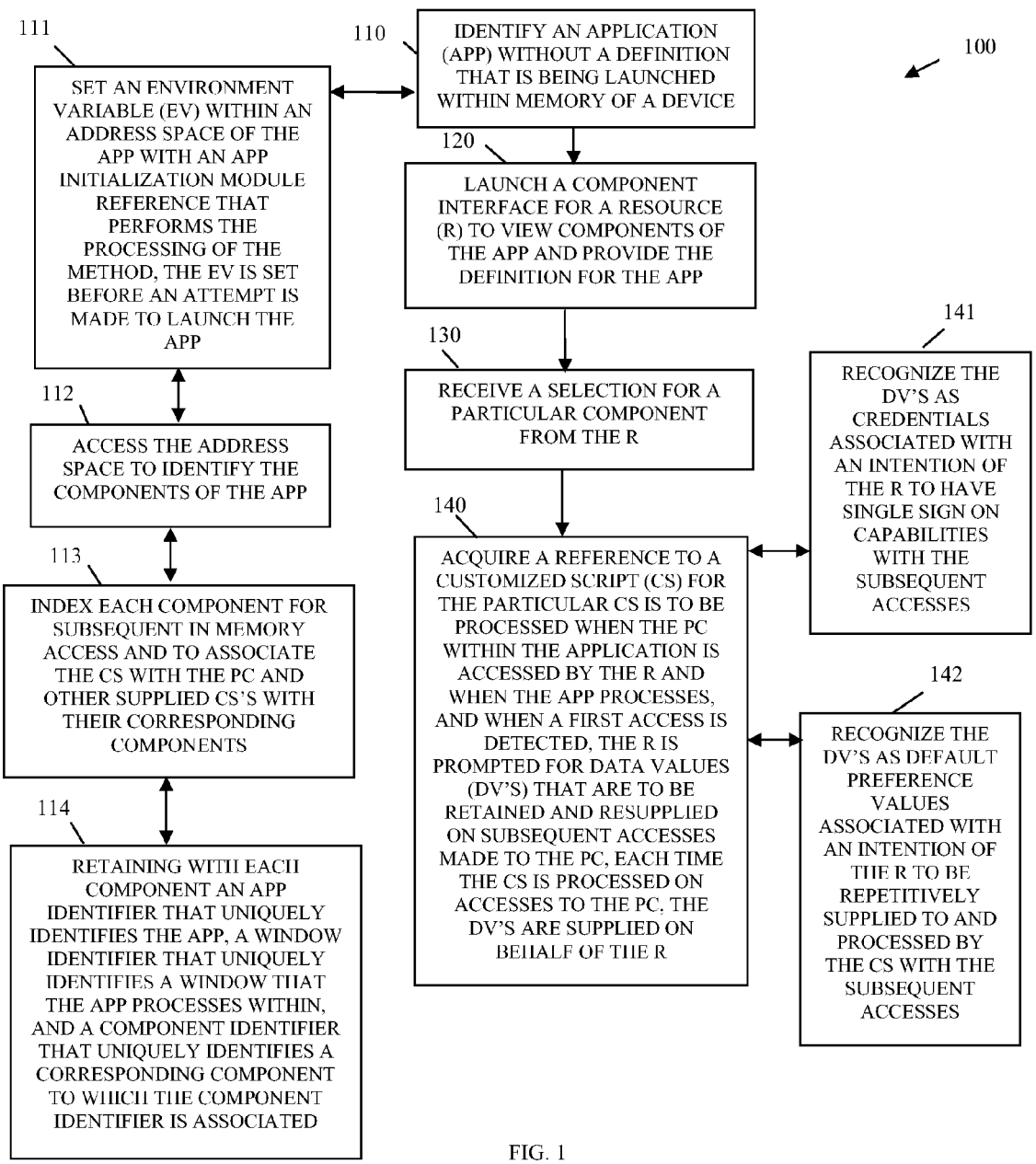
FIG. 1 is a diagram of a method for defining intention based application customization, according to an example embodiment.

FIG. 1 is a diagram of a method 100 for defining intention based application customization, according to an example embodiment. The method 100 (hereinafter "intention-based application customization service") is implemented as instructions in a machine-accessible and readable medium. The instructions when executed by a machine (processor and memory enabled device, computer, etc.) perform the processing depicted in the FIG. 1. The intention-based application customization service is also operational over and processes within a network. The network may be wired, wireless, or a combination of wired and wireless.

As will be more fully described herein and below, the intention-based application customization service permits a resource (such as a user or automated application) to automatically define an application and provide instructions for customized intention based processing, such as single sign on capabilities and the like.

At 110, the intention-based application customization service identifies an application without a definition that is being launched within memory of a device. That is, the intention-based application customization service is called or injected into the load process of the application such that it occupies the same address space as the application. This can be done in a variety of manners, some of which are detailed below. Moreover, this permits the application and its structures to be examined and interfaced with and this occurs without any modification to the legacy code associated with the application. So, no changes are needed in the software instructions of the application to make this happen. This means that a legacy application can be enhanced or customized without altering any of the interfaces associated with the application.

According to an embodiment, at 111, the intention-based application customization service sets an environmental variable within an address space of the application with an application initialization module reference that performs the processing of the intention-based application customization service. The environmental variable is set before an attempt is made to launch the application. A more detailed example of how this is achieved is provided below with the example implementation in Linux using GTK+. Essentially, the normal application loader or launcher or initialization module is replaced or overridden via the setting of the environmental variable so that at runtime the application initialization module is processed via the reference set in the variable.

Continuing with the embodiment of 111 and at 112, the intention-based application customization service accesses the address space to identify the components of the application. Components may be viewed as sections or options within a window that the application processes within, such as a form, a button, or widgets in general. In other words, the application processes within a window of the OS on the device and that window has widgets or components. In some cases, the components may also be viewed as subroutines or features of the application. Since, the intention-based application customization service has access to the address space and since it processes on launch of the application, the component references can be identified and acquired by the intention-based application customization service.

Still continuing with the embodiment of 112 and at 113, the intention-based application customization service indexes each component of the application for subsequent in memory access. This is done to associate or link the customized script (discussed in greater detail below) with a particular selected component and to link other supplied customized scripts with their corresponding components.

In another situation with the embodiment of 113 and at 114, the intention-based application customization service retains with each component an application identifier that uniquely identifies the application; a window identifier that uniquely identifies a window within the OS that the application processes within or is launched from; and a component identifier that uniquely identifies a corresponding component to which the component identifier is associated.

The information collected and indexed by the intention-based application customization service at 112-114 permits the intention-based application customization service to rapidly manage and inject customization into a legacy application or plurality of applications.

At 120, the intention-based application customization service launches a component interface for a resource (user or an automated application) to view components of the application and to provide the definition for the application. The definition provides metadata or information about the components, such as descriptions of inputs, outputs, features, etc. that are useful to the resource or other resources that access and process the application and components thereof. The intention-based application customization service utilizes this definitional information to assist the resources in providing data values for the components (described below) necessary for customization.

At 130, the intention-based application customization service receives a selection for a particular component from the resource. That is, via the component interface a resource, such as a user, is supplied metadata or descriptive details about the components and the user selects a particular component of interest for customization.

At 140, the intention-based application customization service acquires a reference to a customized script for the particular component from the resource. The reference identifies the customized script that the resource wants the intention-based application customization service to call when the resource selects or accesses the particular component. This customized script reflects the intention of the resource; so unlike convention approaches where the actions taken are based on cursor movements and the like, here we have the true intentions of the resource codified via the reference to the customized script.

The customized script can be pre-defined by an administrator or the resource can use the component interface to assist the resource in creating the script in an interactive manner. Some customized scripts can be re-used across different applications and in some situations perhaps even across similar components of a same application.

The customized script is processed when the particular component within the application is accessed by the resource and when the application is processing on the device. Moreover, when a first access of the particular component is detected, the intention-based application customization service prompts the resource for data values that are to be retained and resupplied on subsequent access attempts made to the particular component. Each time the customized script is processed on accesses to the particular component, the data values are automatically and dynamically supplied on behalf of the resource.

According to an embodiment, at 141, the intention-based application customization service recognizes the data values as credentials associated with an intention of the resource to have SSO capabilities to services or other resources associated with the particular component with subsequent access attempts (access attempts that are not a first and initial access attempt). So, a major benefit of the processing is automated SSO features for a resource, such as a user.

In another case, at 142, the intention-based application customization service recognizes the data values as default preference values associated with an intention of the resource to be repetitively supplied to and processed by the customized script on subsequent accesses to the particular component. So, in addition to SSO capabilities any automated replay action can be achieved by the user via the intention-based application customization service. This may be initially populating a form with default values that the resource wants to always be there, when such a feature is not necessarily available elsewhere and when the application is not modified to achieve this customization. Any other replay action desired can be achieved as well.

One now appreciates how intention based customization to an application can be achieved with the processing of the intention-based application customization service. This is done without modifying the application code and can be achieved with any legacy based application.

An example implementation of the intention-based application customization service is now presented within the context of the Linux OS and GTK+ based applications. It is to be understood that this is presented for purposes of illustration only, since the intention-based application customization service can be deployed in any OS or application system.

Example GTK+ Implementation

GTK+ applications are composed of GTKWindows and GTKwidgets mainly. When a GTK+ application is being launched the main GTKWindow is constructed and then the GTKWidgets associated with that window are constructed and displayed.

GTK internally maintains a tree of all the objects (e.g. GTKWidget, components) created for an application. The intention-based application customization service gets access to that widget tree and intelligently maintains the Meta information about the various GUI elements (components) of the application.

After that the intention-based application customization service uses that widget information to track/capture the intention of the user (resource can also be an automated application) to replay later for single sign on (SSO) capabilities (can also be used for other replay customization).

The main line of approach is to inject some code into the application in a secure way at run time, so that the intention-based application customization service can access the internal structure of the application without modifying the application at all. This is significant because legacy application can be customized in the manners presented herein above and below because no changes occur to the application code.

1. Injection of Code:

GTK+ supports the environment variable GTK_MODULES, which specifies a list of arbitrary dynamic modules to be loaded and executed when GTK+ is initialized. It is somewhat similar to the LD_PRELOAD environment variable.

This means that when an application is being launched/executed, the dynamic libraries against which the application is linked are loaded into memory. This information is incorporated into the executable at the time of linking when the application was built.

Using the GTK_MODULES environment variable the intention-based application customization service can load a customized dynamic library, when the GTK+ is being initialized during the launch of the application. In that library a customized implementation of the gtk_module_init( ) function can be deployed and this can poke into the application (as a dynamic library is also able to access the same memory address space as the application) and can access the information of the application structure at run time. The intention-based application customization service can also intercept the main event processing loop so that the intention-based application customization service can do customized actions when a particular event is detected.

2. Retrieving the Object Tree of the Application:

Using GTK API the intention-based application customization service gets the widget tree of the application and names each of the windows in a unique way. Then, each of the widgets within the window is obtained and named in such a way that they are unique within a particular window. This Unique Widget Identifier (UWI) can be used at later point of time to uniquely determine any widget in the application.

This information can be built in the following way:

UWI=Application Id.Window Id.Widget Id

3. Widget Picker:

This tool is used to pick up the widget of interest. When an application is launched, this Widget Picker application is automatically launched and helps the user (resource) pick up the widgets, which need to be tracked/populated for SSO.

This picker uses the above mentioned UWI to identify the specific widget in the application.

4. Writing the Script:

Using the Widget Picker tool, users (resources) are able to get the information about the widgets needed for writing the scripts for automating the replay action. Using the same approach, the intention-based application customization service can also provide the scripts for pre-defined application.

5. Single Sign On:

This is a significant benefit of the techniques described herein. If the script already exists for an application and the credentials are not already present in the credential store, it means that the user is launching the application for the first time. In this case, GTKSSO module has to prompt the user to determine whether he/she wants to use the SSO capability or not. If the user chooses to do so, the module pops up a dialog for reading (by the user) and populates the values of the widgets of interest using the application definition (that the user/administrator has written with the help of Widget Picker tool or manually pre-defined).

Once the values are passed, the corresponding widgets are searched using the UWI stored in the script and the appropriate action is taken based on the command specified in the script.

From the second time onwards, when the application is launched, GTKSSO searches for the specific definition for the application and the widgets of interest in the application are filled with the values obtained from the directory/cache and appropriate action is taken based on the script.

Figure 2:
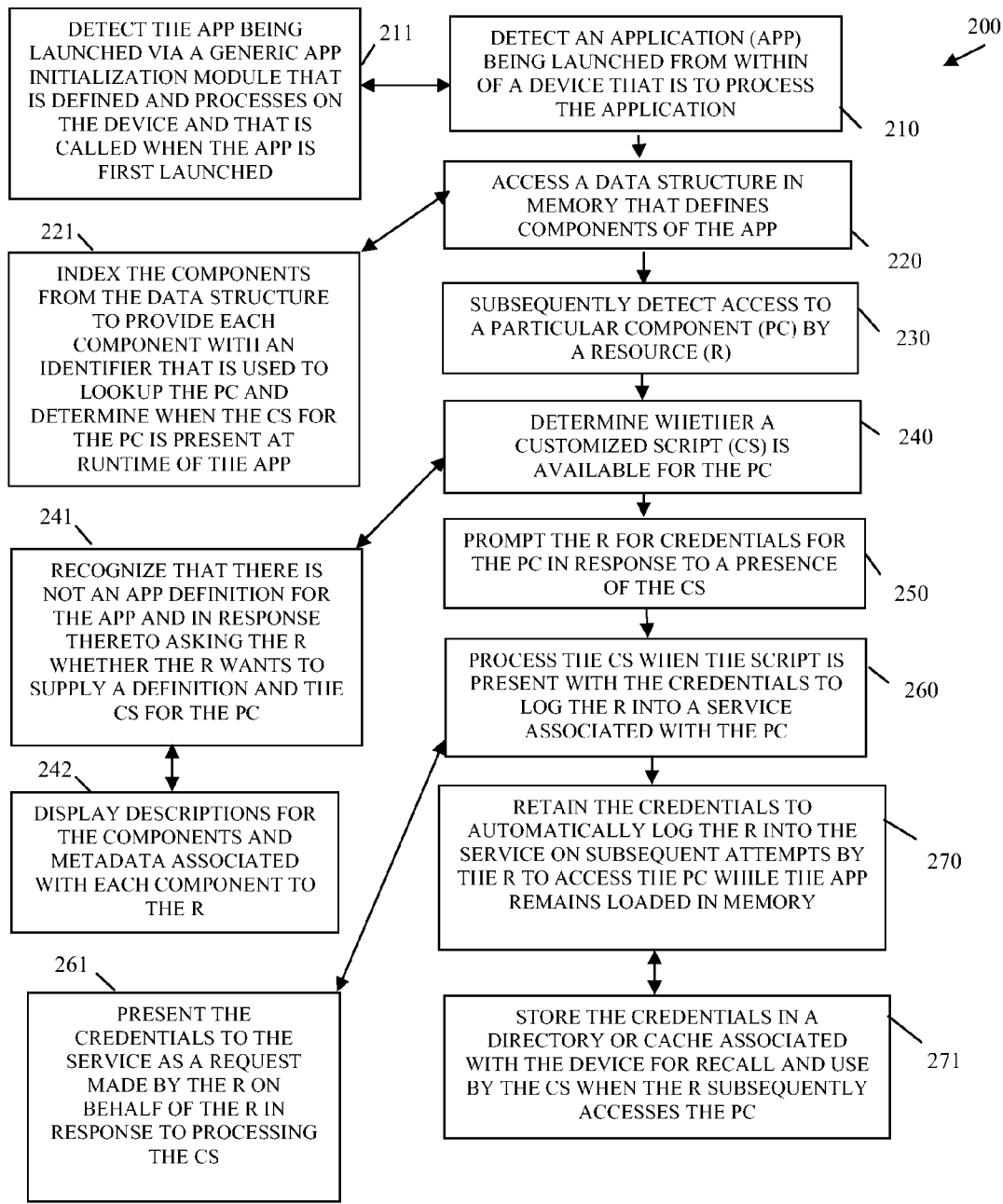
FIG. 2 is a diagram of a method for automated replay actions injected into application processing, according to an example embodiment.

FIG. 2 is a diagram of a method 200 for automated replay actions injected into application processing, according to an example embodiment. The method 200 (hereinafter "customized replay service") is implemented as instructions in a machine-accessible and readable medium. The instructions when executed by a machine perform the processing depicted in the FIG. 2. The customized replay service is also operational over and processes within a network. The network may be wired, wireless, or a combination of wired and wireless.

The customized replay service represents the automated processing of intention based actions taken on behalf of a resource (user or automated application), those actions defined by the intention-based application customization service represented by the method 100 and discussed above with reference to the FIG. 1.

At 210, the customized replay service detects an application being launched from within a device that is to process the application. Example techniques for achieving this were discussed in detail above along with a specific implementation for a Linux OS.

According to an embodiment, at 211, the customized replay service detects the application being launched via a generic application initialization module that is defined and processes on the device and this is called when the application is first launched. By generic it is meant that the generic application initialization module overrides the initialization mechanism provided by an OS or system and can be used not just for a specific application but for any application that desires to have intention based customization injected into its processing flow without modifying the applications.

At 220, the customized replay service accesses a data structure (such as the in memory tree for the application) that defines the components of the application.

In an embodiment, at 221, the customized replay service indexes the components (widgets, routine, etc.) from the data structure to provide each component with a unique identifier, which is then used to a particular component and determine when the customized script for that particular component is present at runtime of the application. Techniques for initially associating the customized script with a particular component as defined by the intentions of a resource were presented in detail above with reference to the method 100 of the FIG. 1.

At 230, the customized replay service detects access to a particular component by a resource. That is, while the application continues to process and after the customized script is associated with the particular component, the resource accesses the component at runtime of the application. Since the customized replay service is injected into the address space of the application this event is detected and the customized replay service can resolve the customized script to call on behalf of the user and make that call.

At 240, the customized replay service determines whether a customized script is in fact available for the particular component that was accessed by the resource.

In some cases, at 241, the customized replay service may recognize that there is not an application definition for the application being processed and in response thereto dynamically asks the resource whether the resource wants to supply a definition and the customized script for the particular component.

Continuing with the embodiment of 241 and at 242, the customized replay service dynamically displays descriptions for the components and other metadata associated with each component to the resource. This was previously defined and permits the resource to intelligently decide what action to take and what information to supply.

In some cases, a resource may set a profile selection that can turn automatic prompting off for components lacking customized scripts, if the resource does not want to have these questions asked at runtime for undefined components. It may also be that the resource is just asked once and from that point forward never asked again; of course, the resource can also go back to the processing associated with the method 100 of the FIG. 1 to later add a customized script to a component if the resource so desires at a later point in time.

At 250, the customized replay service dynamically and in real time prompts the resource for credentials for the particular component in response to a presence of the customized script and when this is the first access being made by the resource to the particular component.

At 260, the customized replay service processes the customized script when the customized script is present with the credentials to log the resource into a service associated with the particular component. This provides SSO capabilities for the resource with respect to that service from this point forward in the application processing lifecycle.

In an embodiment, at 261, the customized replay service dynamically and in real time presents the credentials to the service as a request being made from the resource and on behalf of the resource. This is done in response to processing the customized script.

At 270, the customized replay service retains the credentials to automatically log the resource into the service on subsequent access attempts made by the resource to access the particular component. This is done while the application remains loaded within and processes within memory of the device. This is the SSO capabilities provided to the resource.

According to an embodiment, at 271, the customized replay service stores the credentials in a directory or cache of the device for recall and use by the customized script when the resource subsequently accesses the particular component.

Figure 3:
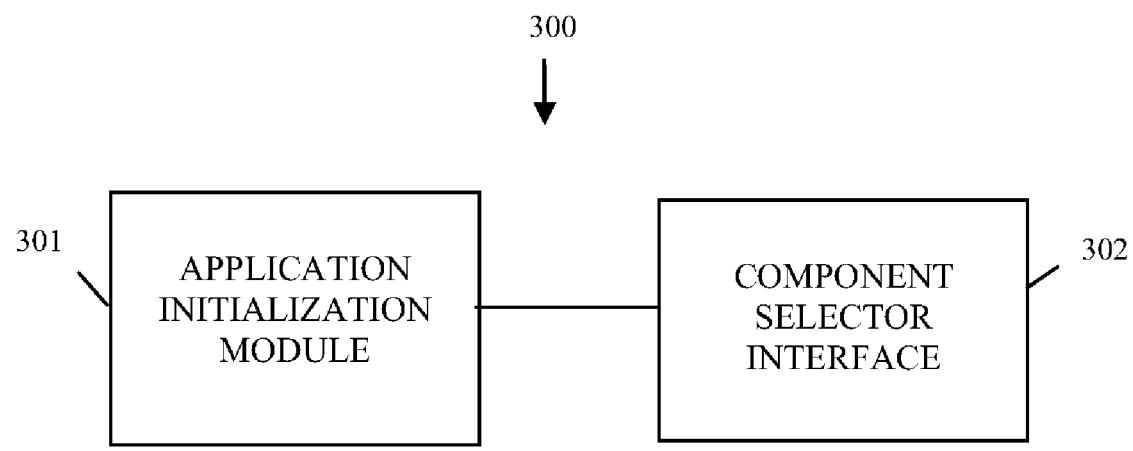
FIG. 3 is a diagram of an intention based application customization system, according to an example embodiment.

FIG. 3 is a diagram of an intention based application customization system 300, according to an example embodiment. The intention based application customization system 300 is implemented as instructions on or within a computer-readable storage medium and a machine-accessible and readable medium. The instructions when executed by a machine (processor-enabled device, computer, etc.) perform various aspects of the processing depicted with respect to the method 100 of the FIG. 1 and the method 200 of the FIG. 2. The intention based application customization system 300 is also operational over a network and the network may be wired, wireless, or a combination of wired and wireless.

The intention based application customization system 300 includes an application initialization module 301 and a component selector interface 302. Each of these components and their interactions with one another will now be discussed in turn.

The application initialization module 301 is implemented in a machine-accessible and readable medium and processes on a device within an address space of an application and called when the application is launched within the address space. Example processing associated with the application initialization module 301 was provided in detail above with reference to the methods 100 and 200 of the FIGS. 1 and 2, respectively.

The application initialization module 301 accesses memory when an application is launched and identifies components (widgets, subroutines, features, etc.) of the application and then calls the component selector interface 302 when the application lacks a definition being managed by the application initialization module 301 and known to the application initialization module 301.

In an embodiment, the application is a graphical user interface (GUI) application and a particular component is a sign in screen for a service that the resource desires to access. The resource supplies initial credentials for retention and usage by a particular script associated to the particular component. The particular script is called and passed the credentials each time the resource accesses the particular component on behalf of the resource for purposes of providing SSO capabilities to the resource for access to the service.

The component selector interface 302 is implemented in a machine-accessible and readable medium and to process on the device. Example processing associated with the component selector interface 302 was discussed above with reference to the method 100.

The component selector interface 302 when called upon presents each component to the resource and permits the resource to supply a reference to a script for each component that is to be processed on behalf of the resource each time that component is accessed.

When a first access to a particular component that has a corresponding particular script reference is made by the resource and when the application is processing, the resource is prompted for data values. The data values are retained and then resupplied to the particular script reference on each subsequent access made to that particular component.

In an embodiment, the data values represent credentials and the particular script reference provides SSO capabilities to the resource.

In another case, each script provides any replay actions (defined by the script) for the resource each time a particular component is accessed after an initial first time.

Figure 4:
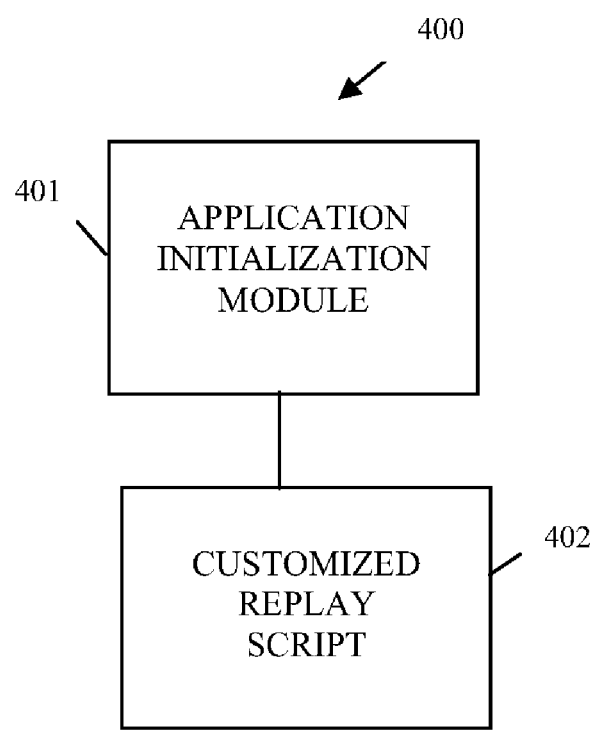
FIG. 4 is a diagram of an automated application replay system, according to an example embodiment.

FIG. 4 is a diagram of an automated application replay system 400, according to an example embodiment. The automated application replay system 400 is implemented as instructions on or within a machine-accessible and computer-readable storage medium. The instructions when executed by a machine (such as a computer, etc.) perform various aspects of the processing depicted with respect to the methods 100 and 200 of the FIGS. 1 and 2, respectively, and processing associated with the system 300 of the FIG. 3. The automated application replay system 400 is also operational over a network and the network may be wired, wireless, or a combination of wired and wireless.

The automated application replay system 400 includes application initialization module 401 and a customized replay script 402. Each of these components and their interactions with one another will now be discussed in turn.

The application initialization module 401 is implemented in a machine-accessible and readable medium and processes on a device within an address space of an application and called when the application is launched within the address space. Example processing associated with the application initialization module 401 was provided in detail above with reference to the methods 100 and 200 of the FIGS. 1 and 2, respectively and with respect to the system 300 of the FIG. 3.

The application initialization module 401 detects when the application is launched and detects when a particular component of the application is accessed that is also associated with or linked to the customized replay script 402.

When the particular component is being accessed after a first time, the application initialization module 401 supplies data values to the customized replay script 402. When the particular component is being accessed for a first time, the application initialization module 401 prompts a resource for the data values that are then retained for subsequent access attempts made by the resource to the particular component.

In an embodiment, the data values are credentials used to authenticate the resource to a service that the particular component accesses. The authentication is initiated by the customized replay script 402 on behalf of the resource.

The customized replay script 402 is implemented in a machine-accessible and readable medium and to process on the device. Example aspects of the customized replay script 402 were provided above with reference to the methods 100 and 200 of the FIGS. 1 and 2, respectively and with respect to the system 300 of the FIG. 3.

The customized replay script 402 uses the data values to replay actions defined in the customized replay script 402 on behalf of the resource.

The customized replay script 402 can be defined in an automated and iterative fashion via a GUI application or can be predefined and linked via the application initialization module 401 to the particular component of the application.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A machine-implemented method, comprising:

identifying an application without a definition configured to be launched within memory of a device, wherein identifying further includes setting an environment variable within an address space of the application with an application initialization module reference that performs the processing of the method, wherein the environment variable is set before an attempt is made to launch the application;

launching a component interface for a resource to view the components of the application and provide the definition for the application;

receiving a selection for a particular component from the resource; and acquiring a reference to a customized script for the particular component from the resource, wherein the customized script is to be processed when the particular component within the application is accessed by the resource when the application processes, and wherein when a first access is detected, the resource is prompted for data values that are to be retained and resupplied on subsequent accesses made to the particular component, each time the customized script is processed on accesses to the particular component, the data values are supplied on behalf of the resource.

2. The method of claim 1, wherein identifying further includes accessing the address space to identify the components of the application.

3. The method of claim 2, wherein accessing further includes indexing each component for subsequent in memory access and to associate the customized script with the particular component and other supplied customized scripts with their corresponding components.

4. The method of claim 3, wherein indexing further includes retaining with each component an application identifier that uniquely identifies the application, a window identifier that uniquely identifies a window that the application processes within, and a component identifier that uniquely identifies a corresponding component to which the component identifier is associated.

5. The method of claim 1, wherein acquiring further includes recognizing the data values as credentials associated with an intention of the resource to have single sign on capabilities with the subsequent accesses.

6. The method of claim 1, wherein acquiring further includes recognizing the data values as default preference values associated with an intention of the resource to be repetitively supplied to and processed by the customized script with the subsequent accesses.

7. The method of claim 1, wherein the customized script is configured to automatically recognize whether a data value is a credential for single sign on capabilities or a default preference value to be supplied to the customized script on a subsequent access.

8. The method of claim 1, wherein the environment variable is configured to override an application loader with the application initialization module reference at runtime of the application.

9. A machine-implemented method, comprising:

detecting an application configured to launch from within memory of a device;

setting an environment variable within an address space of the application with an application initialization module reference that performs the processing of the method, wherein the environment variable is set before an attempt is made to launch the application;

accessing a data structure in memory that defines components of the application;

subsequently detecting access to a particular component by a resource;

determining whether a customized script is available for the particular component;

prompting the resource for credentials for the particular component in response to a presence of the customized script;

processing the customized script when the script is present with the credentials to log the resource into a service associated with the particular component; and retaining the credentials to automatically log the resource into the service on subsequent attempts by the resource to access the particular component while the application remains loaded in memory.

10. The method of claim 9, wherein detecting further includes detecting the application being launched via a generic application initialization module that is defined and processes on the device and that is called when the application is first launched.

11. The method of claim 9, wherein accessing further includes indexing the components from the data structure to provide each component with an identifier that is used to lookup the particular component and determine when the customized script for the particular component is present at runtime of the application.

12. The method of claim 9, wherein determining further includes recognizing that there is not an application definition for the application and in response thereto asking the resource whether the resource wants to supply a definition and the customized script for the particular component.

13. The method of claim 12 further comprising, displaying descriptions for the components and metadata associated with each component to the resource.

14. The method of claim 9, wherein processing further includes presenting the credentials to the service as a request made by the resource on behalf of the resource in response to processing the customized script.

15. The method of claim 9, wherein retaining further includes storing the credentials in a directory or cache associated with the device for recall and use by the customized script when the resource subsequently accesses the particular component.

16. The method of claim 9, further comprising automatically recognizing whether a credential is for automatically logging in the resource or for automatically populating a form.

17. The method of claim 9, wherein the environment variable is configured to override an application loader with the application initialization module reference at runtime of the application.

18. A machine-implemented system, comprising:
an application initialization module implemented in a non-transitory computer readable medium that processes on a device within an address space of an application and called when the application is launched within the address space; and
a component selector interface implemented in a machine-accessible and non-transitory readable medium and to process on the device;
wherein the application initialization module is configured to access memory when an application is launched, identify components of the application, set an environment variable within an address space of the application with an application initialization module reference that performs the processing, and call the component selector interface when the application lacks a definition, when called the component selector interface presents each component to a resource and permits the resource to supply a reference to a script for each component that is to be processed each time that component is accessed, wherein the environment variable is set before an attempt is made to launch the application.

19. The system of claim 18, wherein when a first access to a particular component having a particular script reference is made by the resource when the application processes, the resource is prompted for data values, the data values are retained and resupplied to the particular script reference on subsequent accesses to the particular component.

20. The system of claim 19, wherein data values represent credentials and the particular script reference provides single sign on capabilities to the resource.

21. The system of claim 18, wherein the application is a graphical user interface application and a particular component is a sign in screen for a service that the resource desires to access.

22. The system of claim 21, wherein the resource supplies initial credentials for retention and usage by a particular script assigned to the particular component, the particular script called and passed the credentials each time the resource accesses the particular component on behalf of the resource to provide single sign on capabilities to the resource for access to the service.

23. The system of claim 18, wherein each script provides replay actions for the resource each time a particular component is accessed after an initial first time.

24. The system of claim 18, wherein the particular script reference is configured to automatically recognize whether a data value is a credential for single sign on capability or a default preference value to be supplied to the customized script on a subsequent access.

25. The system of claim 18, wherein the environment variable is configured to override an application loader with the application initialization module reference at runtime of the application.

26. A machine-implemented system, comprising:
an application initialization module implemented in a non-transitory computer readable medium and that processes on a device within an address space of an application and called when the application is launched within the address space; and
a customized replay script implemented in a non-transitory computer readable medium and to process on the device;
wherein the application initialization module detects when the application is launched and detects when a particular component of the application is accessed that is associated with the customized replay script, and wherein when the particular component is being accessed after a first time, the application initialization module supplies data values to the customized replay script, the customized replay script uses the data values to replay actions on behalf of a resource, wherein an environment variable within an address space of the application is set with an application initialization module reference that performs the processing when the application is launched, the environment variable being set before an attempt is made to launch the application.

27. The system of claim 26, wherein the actions are sign in actions that the resource does to log into a service via the particular component.

28. The system of claim 27, wherein the data values are credentials used to authenticate to the service.

29. The system of claim 26, wherein during a first access the resource is prompted for the data values.

30. The system of claim 26, wherein the environment variable is configured to override an application loader with the application initialization module reference at runtime of the application.

* * * * *